(12) United States Patent
Parker

(10) Patent No.: US 7,756,818 B1
(45) Date of Patent: Jul. 13, 2010

(54) DATABASE TABLE RECOVERY SYSTEM

(75) Inventor: Christopher F. Parker, Round Rock, TX (US)

(73) Assignee: Computer Associates Think, Inc., Islandia, NY (US)

(*) Notice: Subject to any disclaimer, the term of this patent is extended or adjusted under 35 U.S.C. 154(b) by 806 days.

(21) Appl. No.: 09/349,198

(22) Filed: Jul. 7, 1999

(51) Int. Cl.
*G06F 7/00* (2006.01)
*G06F 17/30* (2006.01)

(52) U.S. Cl. .................................................. 707/104.1
(58) Field of Classification Search ....................... 707/1, 707/7, 100–102, 200–204, 104.1
See application file for complete search history.

(56) References Cited

U.S. PATENT DOCUMENTS

| | | | | |
|---|---|---|---|---|
| 4,945,474 A | * | 7/1990 | Elliott et al. | 714/16 |
| 4,961,134 A | * | 10/1990 | Crus et al. | 707/8 |
| 5,222,235 A | * | 6/1993 | Hintz et al. | 707/101 |
| 5,404,508 A | | 4/1995 | Konrad et al. | 395/600 |
| 5,430,871 A | | 7/1995 | Jamoussi et al. | 707/202 |
| 5,452,430 A | | 9/1995 | Dievendorff et al. | 714/37 |
| 5,517,641 A | * | 5/1996 | Barry et al. | 707/101 |
| 5,721,915 A | | 2/1998 | Sockut et al. | 707/200 |
| 5,758,357 A | * | 5/1998 | Barry et al. | 707/202 |
| 5,778,390 A | * | 7/1998 | Nelson et al. | 707/204 |
| 5,873,091 A | * | 2/1999 | Garth et al. | 707/102 |
| 5,887,274 A | | 3/1999 | Barry et al. | 707/202 |
| 5,991,772 A | * | 11/1999 | Doherty et al. | 707/202 |
| 6,119,128 A | * | 9/2000 | Courter et al. | 707/202 |
| 6,122,640 A | * | 9/2000 | Pereira | 707/103 R |
| 6,138,106 A | | 10/2000 | Walker et al. | 705/14 |
| 6,173,269 B1 | | 1/2001 | Solokl et al. | 705/39 |
| 6,175,823 B1 | | 1/2001 | Van Dusen | 705/26 |
| 6,189,010 B1 | * | 2/2001 | Isip, Jr. | 707/100 |
| 6,272,503 B1 | * | 8/2001 | Bridge et al. | 707/204 |
| 6,289,355 B1 | * | 9/2001 | Haderle et al. | 707/1 |
| 6,606,617 B1 | * | 8/2003 | Bonner et al. | 1/1 |

OTHER PUBLICATIONS

IBM Technical Disclosure Bulletin; vol. 29, Issue 8; "Minimizing Logging to Facilitate Recovery of Tablespace"; Jan. 1987; p. 1.*
Sessa, D.; Christmas Gift You Don't Want? Trade Up (or Down) on the Web; The Wall Street Journal, Jan. 12, 1998, p. B1.
Fridman, S.; Just in Time for Christmas—A Universal Gift Certificate; Newsbytes News Network; Oct. 21, 1999; see entire document.
Platinum Technology brochure on Fast Recover for DB2 for OS/390, printed Mar. 3, 1999 from Platinum's Web site.
Mohan, C. et al., "Aries: A transaction Recovery Method Supporting Fine-Granularity Locking and Partial Rollbacks Using Write-Ahead Logging".

* cited by examiner

*Primary Examiner*—Ella Colbert
(74) *Attorney, Agent, or Firm*—Baker Botts L.L.P.

(57) ABSTRACT

A system and method for recovering a database table that depends on a tablespace receives a backup copy of the tablespace and reads log records associated with the table. The system then applies the log records to the backup copy and builds new table data pages from the backup copy. Finally, the system scans the new table data pages for records of the first table and updates the table from the records.

15 Claims, 3 Drawing Sheets

DATABASE TABLE RECOVERY SYSTEM

FIELD OF THE INVENTION

This present invention relates in general to database recovery systems, and more particularly to a system and method for recovering a table of a database that does not require the entire database to be recovered.

BACKGROUND OF THE INVENTION

A database, such as DB2 from IBM Corp., may utilize tables that depend from a tablespace. The tablespace contains all of the semi-permanent data of the database, and the tables contain user updates and modifications to that data. Users access the database data from the tablespace by creating a subset of that data in a table, and then modify and update the table data. The users periodically update the database to overwrite the data in the tablespace with the table data.

One problem that occurs when a user updates the data in a table is that the data updates may be incorrect, such as due to a loss of power during a table update, an error in a data input routine, or other common sources of error. In such situations, it is necessary to rebuild the data in the table without storing the table data to the tablespace, because the corrupted data must not be allowed to be transmitted to the tablespace. For example, it is common to keep a log record file of table updates, such that the tablespace data may be updated using the log record file.

One drawback with known methods of recovering tables is that they require that the tablespace be recovered with the log record files. When the tablespace is recovered, all access to the tablespace must be restricted, including access by unaffected tables. In addition, access to all tables must also be restricted until the tablespace is recovered. As a result, if two or more users are utilizing the tablespace to create two or more different tables, then all users are unable to access their tables while the data for a single table is recovered. This drawback may result in complete disruption of work while the tablespace is being recovered.

Based on the foregoing, there is a need for a system and method for recovering a table that substantially eliminate or reduce the problems associated with conventional systems and methods for recovering a table. In particular, a system and method for recovering a table are needed that allow multiple users to access unaffected tables, and that do not require the tablespace to be recovered.

SUMMARY OF THE INVENTION

One embodiment of the present invention is a system and method for recovering a database table that depends on a tablespace. The system receives a backup copy of the tablespace and reads log records associated with the table. The system then applies the log records to the backup copy and builds new table data pages from the backup copy. Finally, the system scans the new table data pages for records of the first table and updates the table from the records.

The present invention provides many advantages. One advantage of the present invention is a system for recovering a table that does not require the tablespace from which the table depends and all other tables that depend from the tablespace to be reconstructed. The present invention returns the reconstructed table to the configuration it was in prior to corruption of the data without also modifying the configuration of the tablespace and other dependent tables.

DETAILED DESCRIPTION

Figure 1:
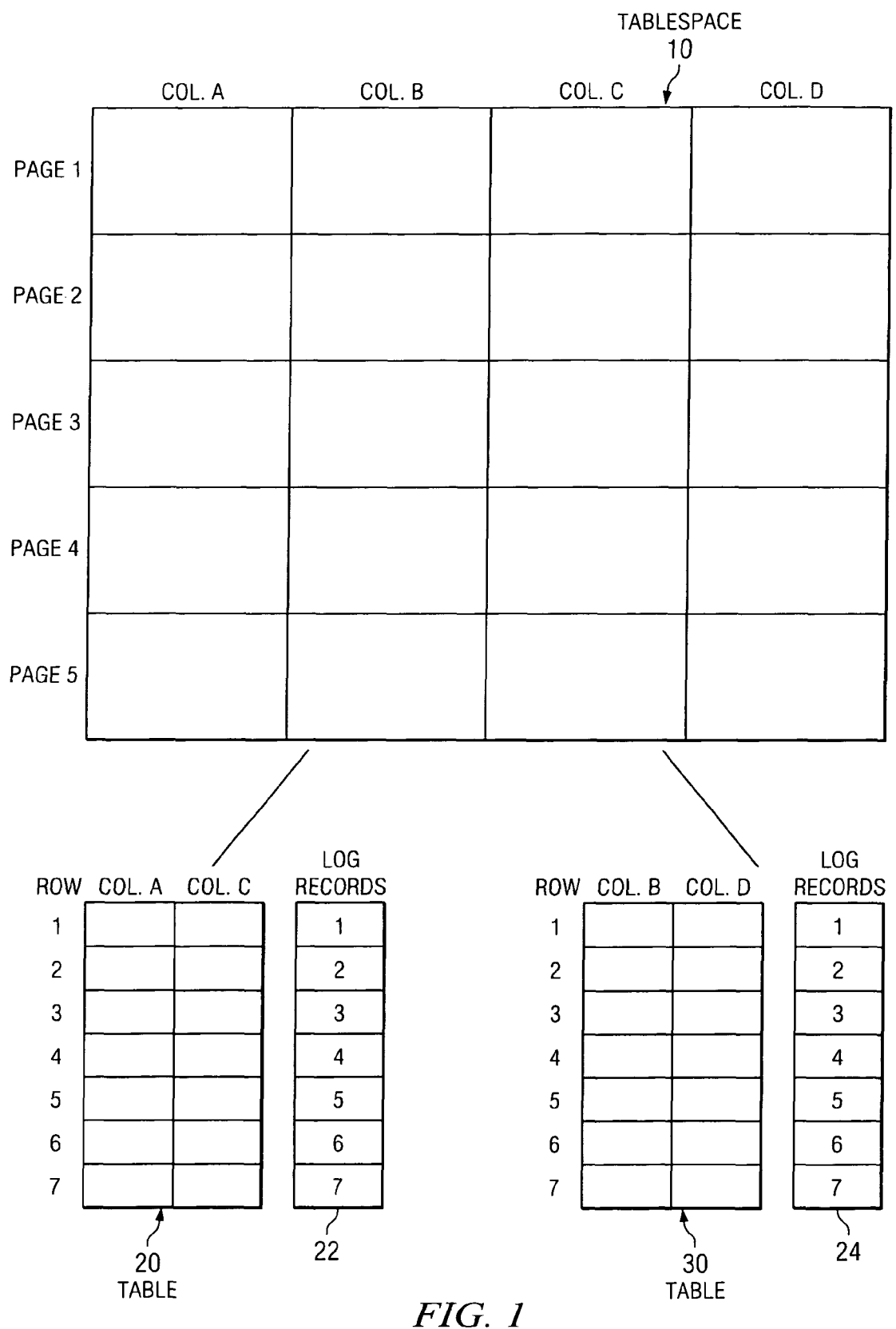
FIG. 1 is a diagram of a tablespace with two dependent tables in accordance with one embodiment of the present invention.

FIG. 1 is a diagram of a tablespace with two dependent tables in accordance with one embodiment of the present invention. A tablespace 10 is broken down into four columns: column A, column B, column C, and column D. In addition, tablespace 10 is broken down into five pages: page one, page two, page three, page four, and page five. The column definitions of each column are uniform across each row and page. The page size of each page is uniform, but may necessarily include varying numbers of rows depending upon the number of characters in variable column fields of each row. For example, if each page contains 4,096 bytes of data, then one page may contain two rows having variable fields that total 4,096 bytes, and another page may contain four rows having variable fields that total 4,096 bytes. Thus, exemplary page one includes four rows, exemplary page two includes two rows, exemplary page three includes three rows, exemplary page four includes four rows, and exemplary page five includes two rows.

Exemplary table 20 and exemplary table 30 are drawn from tablespace 10. Table 20 includes column A data and column C data, while table 30 includes column B data and column D data. Table 20 and table 30 further include rows, but are not broken down into pages of data. In operation, table 20 may become corrupted due to improper data input, systems operation, or other error sources. Any updates that were made to table 20 since the time that table 20 was last read from tablespace 10 must therefore be incorporated into the data of tablespace 10 before table 20 can be reconstructed.

Tables 20 and 30 include log records 22 and 24, respectively. Each log record 22 and 24 is a record of changes that were made to its corresponding table. In addition, a backup copy of tablespace 10 is maintained by the database. The backup copy may be stored on tape or disk, or any other storage medium.

In accordance with one embodiment of the present invention, the updates made to table 20 are applied to the backup copy of tablespace 10 data, which allows table 30 to be accessed in a read-only mode while table 20 is being recovered. Thus, it is not necessary to apply the log records for table 20 and table 30 to tablespace 10 and thus modify tablespace 10 if the data for table 20 is corrupted but the data for table 30 is not corrupted. Instead, table 20 is rebuilt from the backup copy of tablespace 10 to which the updates from the table 20 log record file have been applied. In this manner, the configuration of table 20, table 30, and tablespace 10 are maintained in the state that they were in prior to the corruption of the table 20 data.

The present invention eliminates the need to apply the log record files from table 20 and table 30 to tablespace 10 in order to recover table 20. Users may have read-only access to other tables such as table 30, which reduces the disruption of work that may result from recovery of the data in table 20.

In particular, in one embodiment, read-only access is provided for table 30 to prevent any changes from being made to tablespace 10 while table 20 is being recovered. The backup copy of tablespace 10 is then stored into a working data memory. All of the rows of table 20 are then deleted, and any indices of table 20 are locked out from access to prevent changes to the indices from being made. The log records associated with table 20 are then read from the log.

After the log records are read, they are read to a log record workspace and sorted. The log records are then applied to the backup copy of tablespace 10. Sorting the log records decreases the number of input and output operations that must be made to the backup copy of tablespace 10, which decreases the amount of processing time that is required to recover table 20.

After the log records have been applied to the backup copy of tablespace 10, new table data pages are built with the updated backup copy of tablespace 10. The new table data pages are then scanned for records, or database "rows", that belong to table 20. These records are selected and are used to update table 20. After table 20 is updated, update access to table 20, table 30 and tablespace 10 is allowed.

Figure 2:
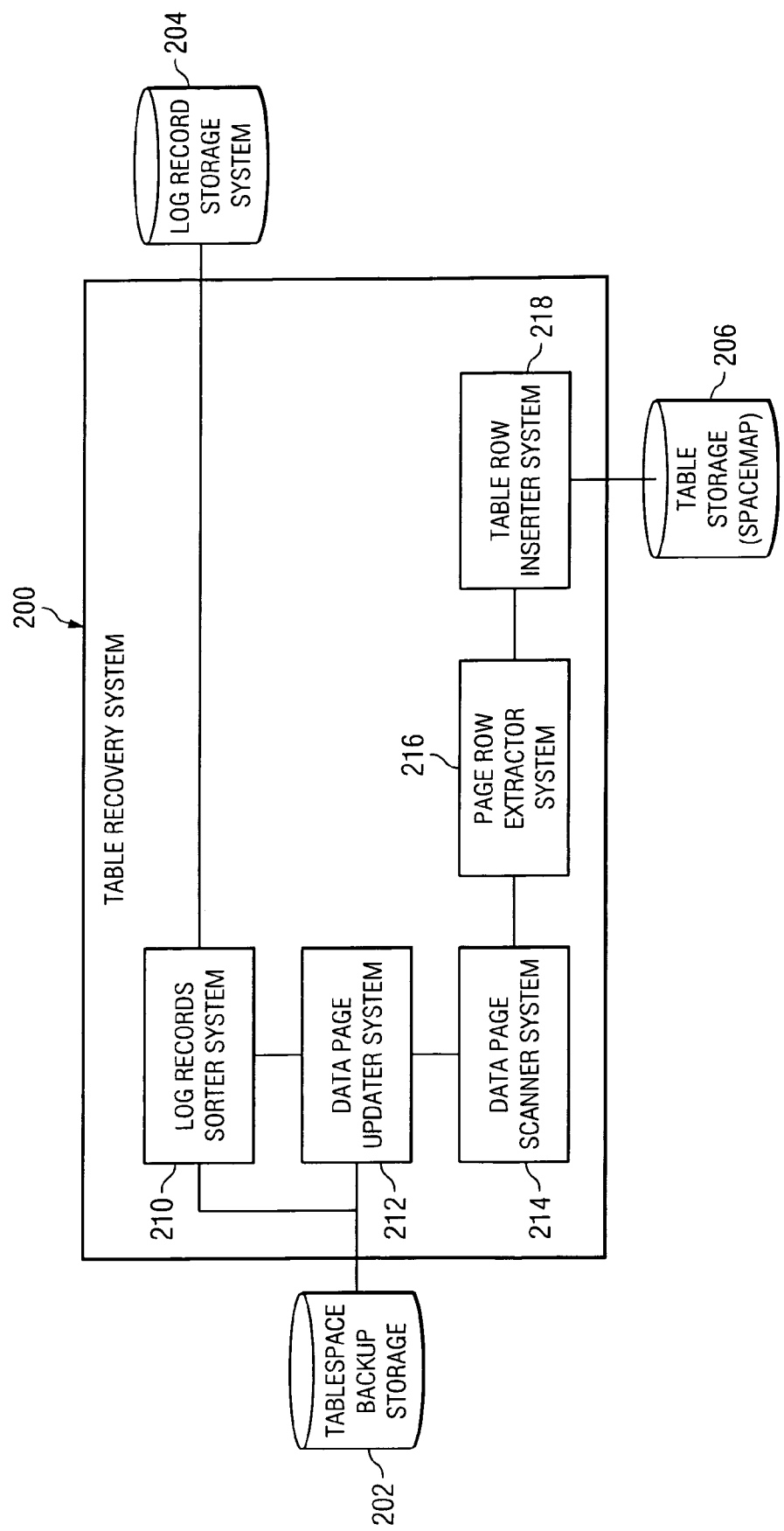
FIG. 2 is a block diagram of a table recovery system in accordance with one embodiment of the present invention.

FIG. 2 is a block diagram of a table recovery system 200 in accordance with one embodiment of the present invention. Table recovery system 200 may be used to recover a table in which corrupted data is stored, such as a table of a DB2 tablespace, without requiring tablespace 10 and all other tables of tablespace 10 to be recovered also. Table recovery system 200 thus returns tablespace 10 and tables to the configuration that they were in prior to the corruption of data in the affected table.

Table recovery system 200 may be implemented in hardware, software, or a suitable combination of hardware and software. Table recovery system 200 is preferably software, such as operating code that operates on a general purpose computing platform. Table recovery system 200 is coupled to tablespace backup storage 202, log record storage system 204, and table storage (spacemap) 206. Tablespace backup storage 202, log record storage system 204, and table storage 206 are disc storage mechanisms, random access memory, or other suitable data storage devices that are used to store tablespace backup data, log record data, and table data respectively.

Table recovery system 200 comprises individual subsystems that may each be implemented as software, hardware, or a suitable combination of software and hardware. Furthermore, the subsystems of table recovery system 200 may be individual functional aspects of a single system. For example, each of the subsystems of table recovery system 200 may be functions or commands in a DB2 database system, or may also or alternatively be logic circuits, programmable devices, or other suitable systems or components.

Log records sorter system 210 is used to sort log records obtained from log record storage system 204. Log records sorter system 210 optimizes input/output operations by grouping sets of log records according to data page and log records location.

Data page updater system 212 is coupled to log records sorter system 210 and tablespace backup storage 202. Data page updater system 212 updates the backup copy of tablespace 10 from tablespace backup storage 202 with sorted log records received from the log records sorter system 210.

Data page scanner system 214 is coupled to data page updater system 212. Data page scanner system 214 is operable to scan the updated tablespace backup copy and identify table rows for extraction.

Page row extractor system 216 is coupled to data page scanner system 214, and extracts the page rows identified by the data page scanner system 214.

Table row inserter system 218 receives the page rows from page row extractor system 216 and inserts them into the table that is being recovered. For example, the table that is being recovered may be stored on table storage system 206, which may be a space map that has been reinitiated with all rows deleted.

In operation, table recovery system 200 is used to recover a table from a tablespace without requiring all tables that depend from tablespace 10 to be rebuilt. For example, table recovery system 200 may operate in a DB2 Database System in which incorrect updates to a table have been made. If the table is not updated, then the incorrect updates will be imposed on tablespace 10, or the updates to the table will be lost. Table recovery system 200 is used to implement the updates to the table without requiring tablespace 10 and all other tables to be reconstructed.

In this manner, the table data may be reconstructed while other tables can be accessed in a "read only" mode. Furthermore, each table and the tablespace is returned to the configuration that was present prior to the corruption of the data in the affected table.

Figure 3:
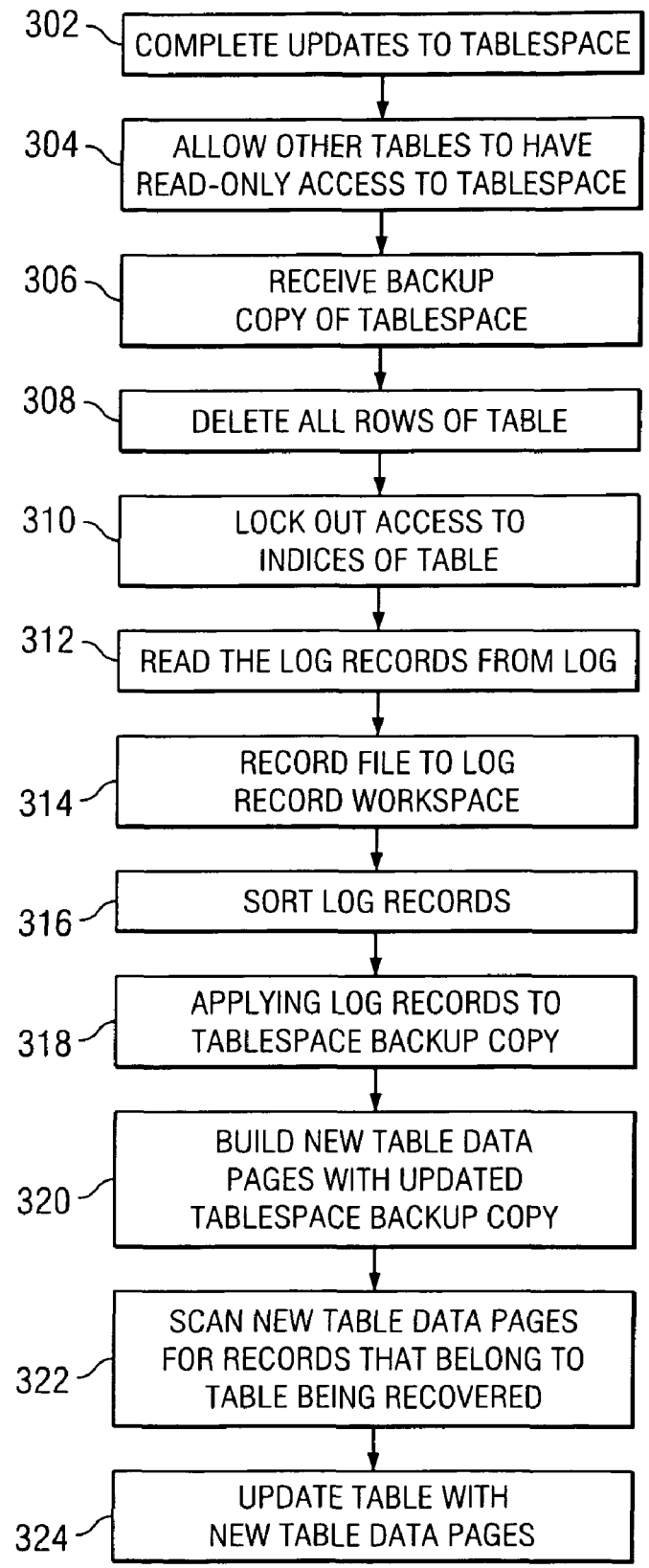
FIG. 3 is a flow chart of steps executed by one embodiment of the present invention for recovering a table.

FIG. 3 is a flow chart of steps executed by one embodiment of the present invention for recovering a table. The steps may be implemented in software, hardware, or a suitable combination of software and hardware, but is preferably software such as operating code that is used with a general purpose computing platform, such as a personal computer or mainframe computer.

At step 302, all updates to tablespace 10 from which the table depends are completed. For example, a DB2 "quiesce" function may be used to implement all queued updates to a tablespace, so as to prevent changes to tablespace 10 from occurring as table recovery is performed. The method then proceeds to step 304.

At step 304, access to other tables that are dependent from tablespace 10 is set to "read only" mode. The method then proceeds to step 306 where the backup copy of tablespace 10 is received from backup storage to system storage. For example, the backup copy of tablespace 10 may be stored to a random access memory, a magnetic data storage medium, or other suitable data storage devices. The method then proceeds to step 308.

At step 308, all rows of the table that is to be reconstructed are deleted. The method proceeds to step 310 where access to the indices of the table is locked out. The indices of the table may be used to verify that the data in the table has not changed after the recovery of the table has been completed. The method then proceeds to step 312 where log records are read from the log record storage associated with the table. The present invention implements those log updates that have occurred prior to table recovery on the copied tablespace, while leaving the original tablespace and all other dependent tables unaffected. In this manner, the table having corrupted data is returned to its original configuration, and no changes are implemented to tablespace 10 or other dependent tables. The method then proceeds to step 314.

At step 314, the log record file is copied to a log record work space. The log record work space is used at step 316 so that the log records may be sorted. The method then proceeds to step 318, where the log records are applied to tablespace 10 backup copy.

At step 320, new table data pages are built with the updated tablespace backup copy. The method then proceeds to step 322 where the new table data pages are scanned for records that belong to the table that is being recovered. For example, each table comprises table keys that are columns from tablespace 10 that have been marked for use by the table.

These table keys are extracted for each row. The method then proceeds to step 324 where the table is updated with the new table data pages from tablespace 10.

In operation, the method of FIG. 3 is used to recover a table after the table data has been corrupted without requiring tablespace from which the table depended on to be recovered. The method of FIG. 3 allows access to other tables of tablespace 10 without requiring those tables to be rebuilt. The method of FIG. 3 also optimizes the table recovery process by sorting the log records, such that input/output operations to tablespace 10 are optimized during the table recovery process.

As described, the present invention allows recovery of a table without requiring the tablespace from which the table depends and all other tables that depend from the tablespace to be reconstructed. The present invention returns the reconstructed table to the configuration it was in prior to corruption of the data without also modifying the configuration of the tablespace and other dependent tables.

Several embodiments of the present invention are specifically illustrated and/or described herein. However, it will be appreciated that modifications and variations of the present invention are covered by the above teachings and within the purview of the appended claims without departing from the spirit and intended scope of the invention.

For example, although the embodiments described allows users to access other tables in read-only mode, in other embodiments the users may be able to access the tables in update access mode while the table is recovered.

What is claimed is:

1. A system for recovering a database table comprising:
a database table recovery system operable to:
retrieve a backup copy of a tablespace;
apply updates to the backup copy from a log associated with a database table; and
restore the database table associated with the tablespace from the updated backup copy without recovering the tablespace; and
a tablespace access system coupled to the database table recovery system, wherein the tablespace access system is operable to restrict access to the tablespace to read-only access.

2. The system of claim 1 wherein the database table recovery system further comprises a log record sorter system operable to sort log records from the log.

3. The system of claim 2 further comprising:
a data page updater system coupled to the log record sorter system operable to apply the log record updates to the backup copy.

4. The system of claim 3 further comprising:
a data page scanner system coupled to the data page updater system, the data page scanner system operable to locate page rows associated with the database table in at least one data page.

5. A system for recovering a database table comprising:
a database table recovery system, the database table recovery system operable to retrieve a backup copy of a tablespace and to apply updates to the backup copy from a log associated with a database table, and to restore the database table associated with the tablespace from the updated backup copy without recovering the tablespace, the database table recovery system comprising a log record sorter system operable to sort log records from the log;
a tablespace access system coupled to the database table recovery system, wherein the tablespace access system is operable to restrict access to the tablespace to read-only access;
a data page updater system coupled to the log record sorter system and operable to apply the log record updates to the backup copy;
a data page scanner system coupled to the data page updater system and operable to locate page rows associated with the database table in at least one data page; and
a page row extractor system coupled to the data page scanner system and operable to extract the page rows from the at least one data page that has been located by the data page scanner system.

6. A system for recovering a database table comprising:
a database table recovery system, the database table recovery system operable to retrieve a backup copy of a tablespace and to apply updates to the backup copy from a log associated with a database table, and to restore the database table associated with the tablespace from the updated backup copy without recovering the tablespace, the database table recovery system comprising a log record sorter system operable to sort log records from the log;
a tablespace access system coupled to the database table recovery system, wherein the tablespace access system is operable to restrict access to the tablespace to read-only access;
a data page updater system coupled to the log record sorter system and operable to apply the log record updates to the backup copy;
a data page scanner system coupled to the data page updater system and operable to locate page rows associated with the database table in at least one data page;
a page row extractor system coupled to the data page scanner system and operable to extract the page rows from the at least one data page that has been located by the data page scanner system; and
a table row inserter system coupled to the page row extractor system and operable to write the extracted page rows to the database table.

7. A method of recovering a first database table that depends on a tablespace, said method comprising:
receiving a backup copy of a tablespace having data for one or more database tables;
reading log records associated with a first database table of the one or more database tables;
applying the log records to the backup copy without recovering the tablespace;
building new table data pages from the backup copy;
scanning the new table data pages for records of the first database table; and
updating the first database table from the records.

8. The method of claim 7, further comprising:
limiting access of a second table to the tablespace to read-only before the first table is updated, wherein the second table depends on the tablespace.

9. The method of claim 8, further comprising:
providing update access to the second table after the first table is updated.

10. The method of claim 7, further comprising sorting the log records.

11. The method of claim 7 wherein the first table, comprises rows and indices, the method further comprising:
deleting the rows; and
locking out the indices.

12. A method for recovering a database table that depends on a tablespace, said method comprising:

receiving a backup copy of a tablespace having data for one or more database tables;

reading log records associated with a first database table of the one or more database tables;

applying the log records to the backup copy without recovering the tablespace;

building one or more table data pages from the backup copy having the log records applied;

selecting one or more records from the one or more database table data pages, the one or more records belonging to the first database table; and updating the first database table with the one or more records selected from the one or more table data pages, while allowing access to the rest of the one or more database tables in the tablespace, wherein the first database table can be recovered without having to recover the tablespace.

13. The method of claim 12, further comprising:

allowing said at least one of the one or more database tables to have update access to the tablespace when the first database table is restored.

14. The method of claim 12, further comprising:

deleting all of the rows of the first database table; and locking out access to indices of the first database table.

15. The method of claim 12, wherein applying log records to the tablespace backup copy further comprises:

reading the log records from a log record file to a log record workspace;

sorting the log records; and applying the log records to the tablespace backup copy.

* * * * *